Jan. 9, 1940.　　　　H. F. SMITH　　　　2,186,844
REFRIGERATING APPARATUS
Filed May 31, 1935　　　3 Sheets-Sheet 1

INVENTOR.
Harry F. Smith,
BY
ATTORNEYS

Jan. 9, 1940.  H. F. SMITH  2,186,844
REFRIGERATING APPARATUS
Filed May 31, 1935   3 Sheets-Sheet 2
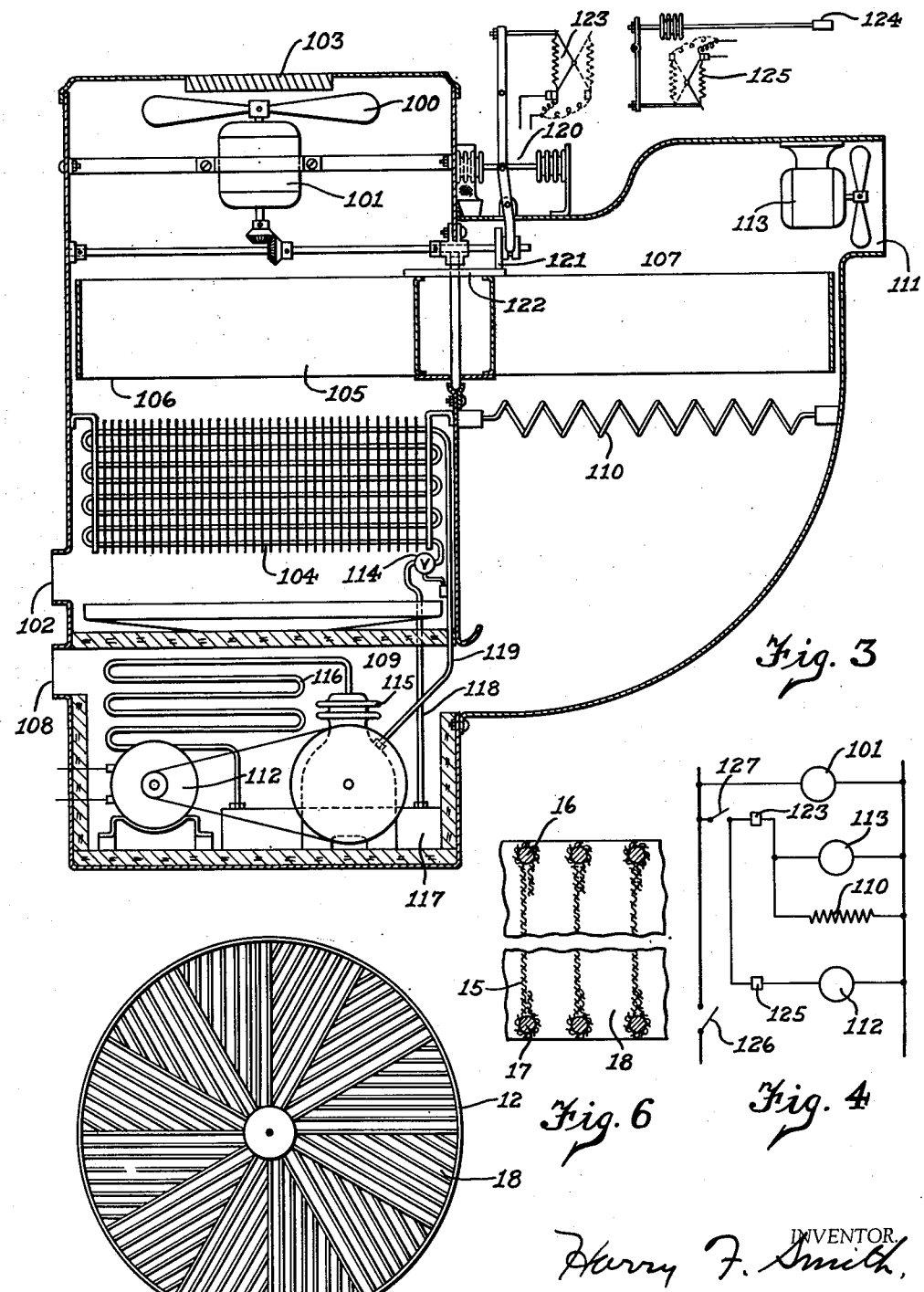

Jan. 9, 1940.   H. F. SMITH   2,186,844
REFRIGERATING APPARATUS
Filed May 31, 1935   3 Sheets-Sheet 3

Patented Jan. 9, 1940

2,186,844

UNITED STATES PATENT OFFICE 2,186,844

REFRIGERATING APPARATUS

Harry F. Smith, Dayton, Ohio, assignor to General Motors Corporation, Dayton, Ohio, a corporation of Delaware Application May 31, 1935, Serial No. 24,232

15 Claims. (Cl. 62—6)

This invention relates to air conditioning.

An object of this invention is to provide an improved method and apparatus for cooling and modifying the moisture content of air.

Further objects and advantages of the present invention will be apparent from the following description, reference being had to the accompanying drawings, wherein a preferred form of the present invention is clearly shown.

In the drawings:

Fig. 3 is a view, somewhat similar to Fig. 1, but showing a modified form of the invention;

Fig. 4 is a wiring diagram of the apparatus shown in Fig. 3;

Fig. 5 is a plan view of the drying medium disk shown in Figs. 1 and 3;

Fig. 6 is an enlarged vertical cross-sectional view of a portion of the disk shown in Fig. 5;

Figure 1:
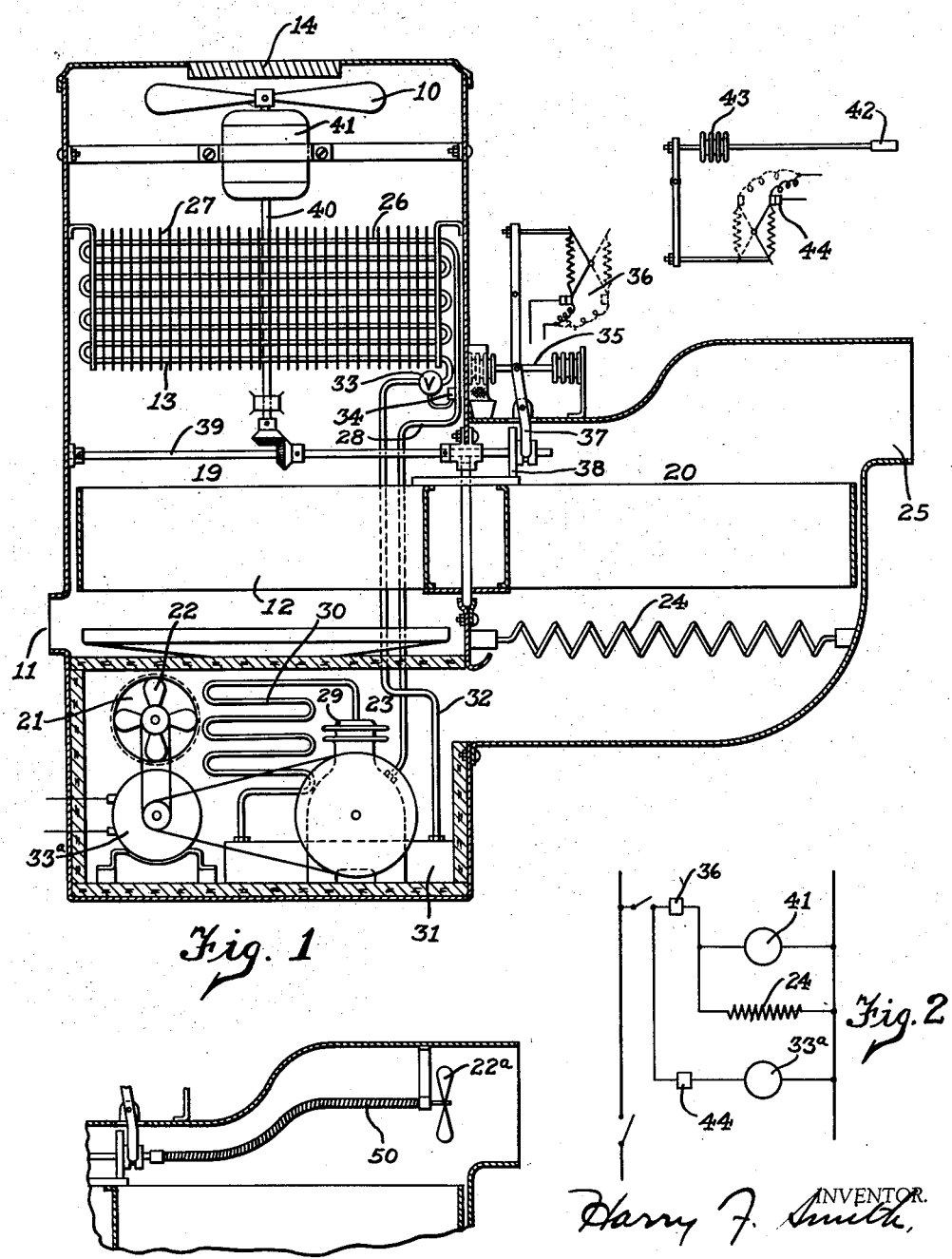
Fig. 1 is a diagrammatic representation, partly in cross-section, of an apparatus embodying features of my invention.

In practicing my invention, an air conditioning apparatus or cabinet is provided with a fan 10 or other similar means for circulating air to be conditioned. The stream of air to be conditioned enters at 11 and is brought into contact with a drying medium carried by the rotating disk 12 where the air is treated or dried. It thereafter passes through a cooling or heat absorber section 13 and is discharged through the opening 14 into the room or other space for which the air is conditioned.

The drying medium preferably is carried on a rotating disk having a plurality of vertical cloths 15 carried on horizontal bars 16 and 17 which are supported on the disk 12 to provide passages 18 between the vertical cloths. The cloths 15 are treated with a solution of the drying medium, such as lithium chloride, which causes it to remove moisture from the air. The disk 12 rotates slowly to bring different portions thereof successively through the air treating section 19 and through the regenerating section 20. The disk removes moisture from the air in the treating section 19 and then gives up this moisture to a second stream of air in the regenerating section 20. The second stream of air may enter through the inlet 21 under the impulse of fan 22 and is heated partly by the heat removed from the first air stream by being brought into contact with the refrigerant liquefying unit or heat dissipating section 23, hereinafter to be more fully described. It is thereafter further heated by an electrical heater 24, if necessary, and in this heated condition comes in contact with the lithium chloride at such a temperature as to remove moisture therefrom and regenerate it for reuse. Thereafter the second stream of air is discharged through the outlet 25 through a window, or other opening, in the room. The inlet 21 may be connected either to the interior of the room, or, if desired, to a conduit passing through a window of the room and thus receiving air from outside the room.

The cooling unit 13 may take the form of an evaporator having refrigerant pipes 26 through which expanded refrigerant flows. These pipes may be provided with vertical fins 27 between which the air flows. The expanded refrigerant returns through the line 28 to a compressor 29, of the liquefying unit 23, where the refrigerant is compressed and is discharged into a condenser 30 from whence it is discharged into the liquid refrigerant receiver 31. Liquid refrigerant leaves the receiver 31 through the line 32 and is expanded by a valve 33 before it enters the evaporator 26. The valve 33 may be of the type which automatically introduces refrigerant into the evaporator when the pressure therein is reduced below a predetermined amount. This valve may be automatically throttled by a thermostatic bulb 34 whenever the refrigerating effect from the evaporator 26 reaches the bulb 34. The compressor 29 may be driven by an electric motor 33a which also drives the fan 22.

Automatic controls may be provided for the apparatus. Thus a hygrostat 35, responsive to the relative humidity of the air in the room, operates a snap switch 36 which in turn starts and stops the motor 41 and controls the electric current flowing through the heater 24. In addition, an arm 37 is provided which moves the driving wheel 38 which is rotatively keyed to the shaft 39 and causes the disk 12 to be driven at varying speeds in response to relative humidity conditions of the air. The shaft 39 may be geared to the shaft 40 which is connected to the motor 41 which drives the fan 10. Thus the circulation of air and the drying power of the disk 12 are modified in accordance with the relative humidity of the air in the room.

A thermostatic bulb 42, which may be placed in the room, causes a bellows 43 to operate a snap switch 44. This snap switch starts and stops the motor 33ᵃ which drives the compressor 29. Thus the air to be conditioned is cooled in accordance with the temperature of the air in the room. When the temperature of the air in the room rises above a predetermined limit, the compressor starts and when the temperature is reduced to a predetermined limit the compressor stops. When the relative humidity of the air in the room rises the fan 10 is operated and the disk 12 is driven at a relatively fast rate. As the relative humidity decreases the speed of the disk 12 decreases until finally the fan 10 and motor 41 are stopped by the switch 36.

Figure 1A:
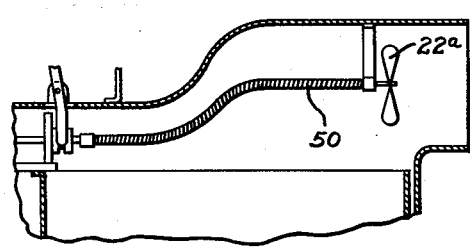
Fig. 1a shows a portion of of the apparatus of Fig. 1 with a modified form of fan drive.
Figure 2:
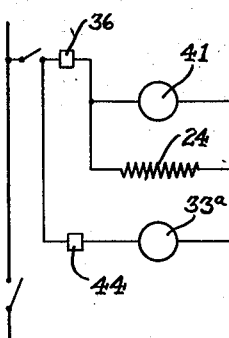
Fig. 2 is a wiring diagram for the apparatus shown in Fig. 1.

In the modification shown in Fig. 1a a fan 22a is driven by a flexible shaft 50 which may be connected to the end of the shaft 39. The fan 22a may supplement, or replace, the fan 22 in Fig. 1. Otherwise, the remainder of the apparatus for Fig. 1a may be exactly the same as that shown in Fig. 1.

In the modification shown in Fig. 3 air to be conditioned is caused to circulate by means of the fan 100 driven by the motor 101. Air enters at 102 either from the room or from outside the room and is discharged into the room through the outlet 103. The steam of air to be conditioned passes through the cooling section 104, similar to section 13. Thereafter the air passes through air treating or drying section 105 through which the disk 106 rotates. The air is thereafter discharged through the outlet 103. The disk 106 rotates between the air treating section 105 and the regenerating section 107. A second stream of air enters through the inlet 108, either from inside the room or outside the room, and is heated by thermal contact with the refrigerant liquefying unit 109. Thereafter, if desired, the air is further heated, or alternatively heated, by the electric heater 110. The heated air then comes in contact with the drying medium on the disk 106 at such a temperature that moisture is removed from the drying medium carried on the disk. Thereafter the air is discharged through the outlet 111. This second stream of air may be circulated by a fan driven either by the motor 112 or by the motor 113 or both.

The evaporator 104, which may be provided with an expansion valve 114 similar in construction and function to the valve 33, is connected in refrigerant flow relationship with the liquefying unit 109. Refrigerant is compressed in the compressor 115, condensed in condenser 116 and stored in the receiver 117. The liquid refrigerant flows through the pipe 118, through the valve 114, through the evaporator 104 and back through the line 119 to the compressor 115. The compressor 115 is driven by the motor 112.

Automatic controls may be provided. A hygrostat 120 moves the driving wheel 121 radially, inwardly or outwardly, on the platform 122 to vary the speed of rotation of the disk 106. The hygrostat also opens and closes the snap switch 123 which governs the operation of the motor 113 and of the heater 110. The thermostat 124 opens and closes the switch 125 which starts and stops the motor 112. The arrangement is such that when the temperature in the room rises to a predetermined degree the motor 112, together with the compressor 115, is caused to operate until such time as the temperature in the room is reduced to a predetermined limit.

If the relative humidity rises, the snap switch 123 is closed thus starting the motor 113 and the heater 110. This causes the disk 106 to dry the air after it leaves the evaporator 104. A hand switch 126 controls the operation of the entire device. When this is closed the motor 101 is caused to operate and to circulate air through inlet 102 and the outlet 103. A second hand switch 127 places the automatic controls in command of the drying and cooling device. Thereafter, if the temperature and relative humidities require it, the apparatus is caused to cool and/or dry the air automatically in response to various conditions.

Figures 7, 8:
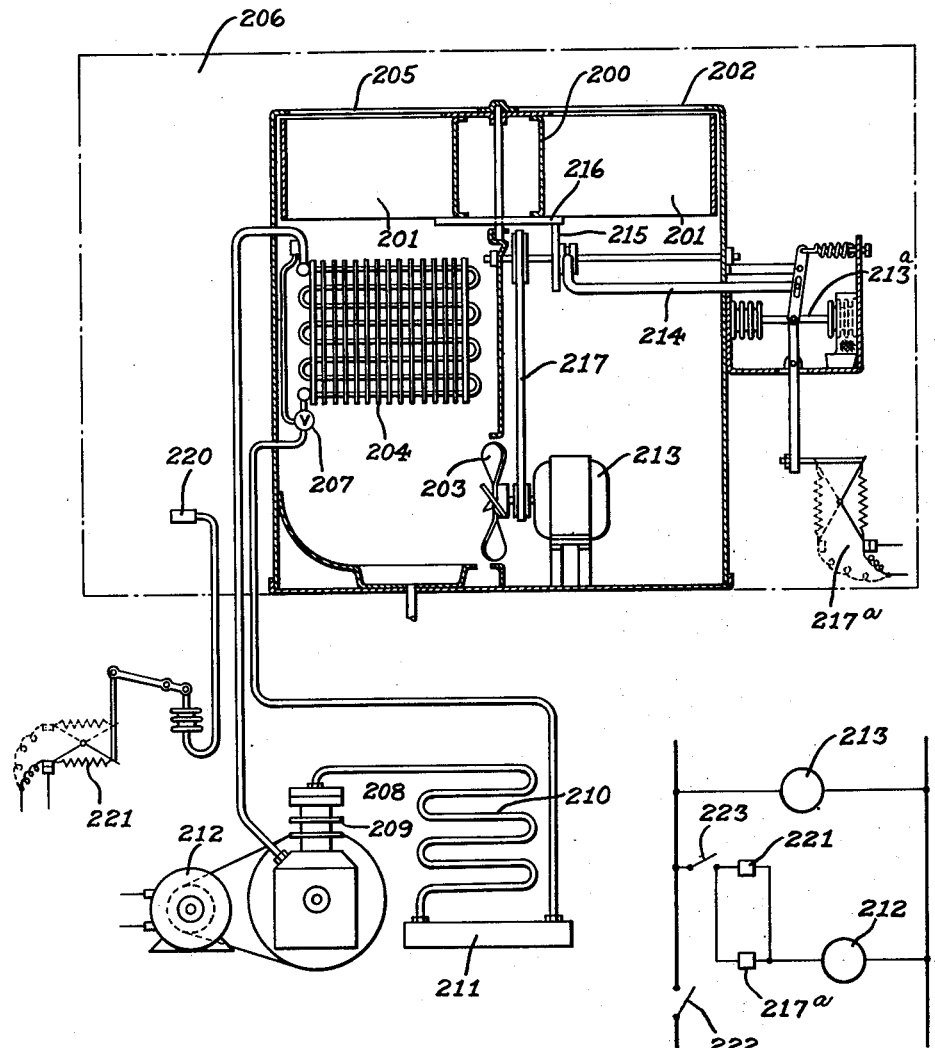
Fig. 7 is a view, somewhat similar to Fig. 1 or 3, but showing a further modification.
Fig. 8 is a wiring diagram of the apparatus shown in Fig. 7.

In the apparatus shown in Fig. 7, a disk 200 is provided which has merely heat carrying metallic fins arranged with the same general arrangement as the drying cloths of the disks 12 and 106. These vertical fins 201 are merely heat carrying fins. Air enters at 202 and is cooled by contact with the cold fins 201 on the right hand side of the disk, then it passes the fan 203 and is cooled by the evaporator 204. Thereafter it passes between the fins 201 on the left hand side of the disk where the air is warmed and is discharged through the outlet 205 into the room 206. The evaporator 204 is provided with an expansion valve 207 similar in construction and function to the valve 33 of Fig. 1. The evaporator 204 is connected in refrigerant flow relationship with the refrigerant liquefying unit 208 comprising a compressor 209, condenser 210 and receiver 211. The compressor 209 is driven by a motor 212. The fan 203 is driven by motor 213.

Automatic controls are provided. A hygrostat 213a moves the rod 214 which in turn moves the wheel 215 radially, inwardly or outwardly under the platform 216. The wheel 215 is driven by a belt 217 from the motor 213. As the relative humidity increases the wheel 215 is moved outwardly to increase the rate of rotation of the disk 200. In addition, a snap switch 217a is closed when the relative humidity reaches a predetermined limit. When this is closed, the motor 212 is caused to rotate and to provide refrigeration. A thermostat 220 controls the switch 221 which in turn also controls the operation of the motor 212. Thus refrigeration is provided whenever the relative humidity or the temperature rises above predetermined limits and refrigeration continues to be provided until both the temperature and the relative humidity are reduced below required limits. The rate of rotation of disk 200 is controlled in accordance with relative humidity. If the relative humidity is low, then the disk 200 rotates very slowly and thus practically the cooling power of the evaporator 204 is used to produce sensible cooling (dry bulb) in the room 206. As the relative humidity increases, the rate of rotation of the disk 200 increases. This causes the disk 200 to remove sensible heat (dry bulb) from the air as it enters at 202. Thereafter the evaporator 204 further cools the air and removes moisture therefrom. Thereafter, some of the heat removed at 202 is restored by the disk 200 to the air before it leaves at 205. In this latter case the cooling power of the evaporator 204 is used to remove moisture from the air with practically no reduction in dry bulb temperature.

The apparatus of Fig. 7 may be placed under the control of a manual master switch 222. When this is closed the fan motor 213 is caused to operate. Another hand switch 223 may be closed, and this places the refrigerating apparatus and the heat transfer disk 200 under the control of the automatic controls.

While hygrostatic and thermostatic elements have been specifically disclosed at certain locations, it is to be understood that a hygrostat may be substituted for a thermostat or a thermostat may be substituted for the hygrostat. Also, that the apparatus may be placed under the single control of any instrument which is responsive to any function of air condition. Thus it may be placed under the control of an instrument which is responsive to the effective temperature of the air.

While the form of embodiment of the invention as herein disclosed, constitutes a preferred form, it is to be understood that other forms might be adopted, all coming within the scope of the claims which follow.

What is claimed is as follows:

1. Air conditioning apparatus for an enclosure comprising means disposed within said enclosure for circulating a stream of air to be conditioned, cooling means within said enclosure for said stream, means for contacting a drying medium with said stream, said last means including means for regenerating said drying medium by means of waste heat dissipated by said cooling means, and means for varying the cooling effect of said cooling means in response to a change in the psychrometric condition of the air.

2. And conditioning apparatus for an enclosure comprising means for circulating a stream of air to be conditioned, cooling means for said stream disposed within said enclosure, means for contacting a drying medium with said stream, said last means including means utilizing heat removed by said cooling means for regenerating said drying medium, and means for varying the drying effect of said drying medium in response to a change in the psychrometric condition of the air.

3. Air conditioning apparatus comprising an air treating section, a heat dissipating section, a regenerating section, a heat absorber in said air treating section, a heat dissipator in said heat dissipating section, heat carrying means connecting said absorber and dissipator, means for conveying a moisture absorbing medium between said air treating section and said regenerating section, means for circulating a first stream of air through said air treating section, and means for circulating a second stream of air through said heat dissipating and regenerating sections.

4. Air conditioning apparatus comprising an air treating section, a heat dissipating section, a regenerating section, a heat absorber in said air treating section, a heat dissipator in said heat dissipating section, heat carrying means connecting said absorber and dissipator, means for conveying a moisture absorbing medium between said air treating section and said regenerating section, means for circulating a first stream of air through said air treating section, means for circulating a second stream of air through said heat dissipating and regenerating sections, and means for regulating the movement of said moisture absorbing medium in response to a change in the psychrometric condition of the air.

5. Air conditioning apparatus comprising an air treating section, a heat dissipating section, a regenerating section, a heat absorber in said air treating section, a heat dissipator in said heat dissipating section, heat carrying means connecting said absorber and dissipator, means for conveying a moisture absorbing medium between said air treating section and said regenerating section, means for circulating a first stream of air through said air treating section, means for circulating a second stream of air through said heat dissipating and regenerating sections, and means for regulating the operation of said absorber and dissipator in response to a change in the psychrometric condition of the air.

6. The method of conditioning air which comprises circulating a first stream of air, circulating a second stream of air, removing heat from said first stream of air and discharging said heat into said second stream of air, introducing moisture from said first stream of air into an affinitive medium, and discharging said moisture from said medium into said second stream of air after said heat has been discharged into said second stream of air.

7. The method of conditioning air for a room which comprises circulating a first stream of air, circulating a second stream of air from said room, removing heat from said first stream of air and discharging said heat into said second stream of air, introducing moisture from said first stream of air into an affinitive medium, discharging said moisture from said medium into said second stream of air, and controlling the introduction of said moisture into said affinitive medium in response to a change in the psychrometric condition of the air.

8. The method of conditioning air which comprises contacting a first stream of air with a solution of a hygroscopic medium, thermally contacting said first stream of air with an expanding refrigerant, compressing and condensing said refrigerant for reuse, heating a second stream of air with heat dissipated while compressing and condensing said refrigerant, contacting said medium with said second stream of air after said second stream of air has been heated, and thereafter recontacting said medium with said first stream.

9. The method of conditioning air for a room which comprises removing moisture from the air while in said room, independently removing heat from the air, utilizing said removed heat for dissipating said moisture and automatically controlling the removal of moisture in accordance with a function of the psychrometric condition of air.

10. Air conditioning apparatus comprising means for circulating a stream of air to be conditioned, means for removing heat from said stream, means for contacting a drying medium with said stream, means for regenerating said drying medium outside said stream by using the heat removed from the air and means for returning to said stream a portion of the heat originally removed from said stream.

11. The method of conditioning air for an enclosure which comprises transferring moisture from the air while in said enclosure to a drying medium, removing heat from said air in said enclosure after the transfer, and utilizing heat so removed for regenerating said drying medium.

12. Portable air conditioning apparatus for a room comprising a cabinet adapted to be mounted in said room, means therein forming a first named passageway for air to be conditioned, means forming a second named passageway, means for circulating air from said room through said second named passageway, cooling means in said first named passageway, heat dissipating means in said second named passageway, and means for circulating a drying medium between said passageways.

13. The method of conditioning air for an enclosure which comprises removing latent and sensible heat from air for said enclosure, discharging the removed heat into air withdrawn from said enclosure, controlling the removal of latent heat in accordance with one function of the psychrometric condition of air, and controlling the removal of sensible heat in accordance with a different function of the psychrometric condition of air.

14. The method of conditioning air for a room which comprises circulating a first stream of air for said room, circulating a second stream of air from said room to the outside of said room, removing heat from said first stream of air and discharging said heat into said second stream of air, introducing moisture from said first stream of air into an affinitive medium, and discharging said moisture from said medium into said second stream of air.

15. Air conditioning apparatus for an enclosure comprising a cabinet in said enclosure, means disposed within said cabinet for circulating a stream of air to be conditioned, cooling means within said cabinet for said stream, means for contacting a drying medium with said stream, said last means including means within said cabinet for regenerating said drying medium by means of waste heat dissipated by said cooling means, and means for varying the cooling effect of said cooling means in response to a change in the psychrometric condition of the air.

HARRY F. SMITH.